United States Patent

[11] 3,610,953

[72] Inventors Bernard M. Gordon
Magnolia, Mass.;
Bruce K. Smith, Londonberry, N.H.
[21] Appl. No. 18,787
[22] Filed Mar. 3, 1970
[45] Patented Oct. 5, 1971
[73] Assignee Gordon Engineering Company
Waltham, Mass.
Continuation of application Ser. No. 628,875, Apr. 6, 1967, now abandoned.

[54] SWITCHING SYSTEM
9 Claims, 5 Drawing Figs.

[52] U.S. Cl. .... 307/230, 307/251, 307/244, 307/255, 307/242, 340/347 DA
[51] Int. Cl. .... H03K 13/14, G06g 7/12
[50] Field of Search .... 307/254, 244, 251, 255, 242, 229, 230; 340/347 DA

[56] References Cited
UNITED STATES PATENTS

| | | | |
|---|---|---|---|
| 3,019,426 | 1/1962 | Gilbert | 307/254 |
| 3,089,963 | 5/1963 | Djorup | 307/254 |
| 3,140,408 | 7/1964 | May | 330/9 |
| 3,155,963 | 11/1964 | Beonsel | 307/254 |
| 3,374,362 | 3/1968 | Miller | 307/254 |
| 3,386,053 | 5/1968 | Priddy | 307/254 |

*Primary Examiner*—Donald D. Forrer
*Assistant Examiner*—Harold A. Dixon
*Attorney*—Morse, Altman & Oates

ABSTRACT: A current-switching system having an input terminal connected to a resistance, the latter being connectable by a first switch to ground, and connectable by a second switch to a summing junction at the input of an operational amplifier, the two switches being driven so that their conduction states are substantially mutually exclusive, both switches exhibiting substantially zero voltage drops during conduction.

INVENTORS.
BERNARD M. GORDON
BRUCE K. SMITH
BY
Robert J. Schiller
ATTORNEY

INVENTORS.
BERNARD M. GORDON
BRUCE K. SMITH
BY
Robert J. Schiller
ATTORNEY

SWITCHING SYSTEM

CROSS-REFERENCE TO RELATED APPLICATION

This application is a continuation of application Ser. No. 628,875, filed Apr. 6, 1967, now abandoned.

This invention relates to switching systems, and more particularly, to electronic switching systems particularly adapted for use in converters, multiplexers and the like.

Semiconductor devices, such as transistors and the like, have found extensive use as electronic switches. For example, the emitter and collector of a transistor can be considered the switch contacts, the base then being the switch control for opening and closing the contacts. An ideal switch can be defined as one which, at least in one aspect, displays no voltage drop between its input and output during its "on" state. Similarly, when the switch is open or "off," it should exhibit effectively infinite resistance. This aspect of the switching properties of semiconductors is important where the switching of low-level signals is involved such as in communication signal switching, digital-to-analog and analog-to-digital conversion, multiplexing and the like.

Thus, a superior low-level current switch should be capable of having its input and output circuits connected with introduction of minimum impedance and minimum voltage drop when switched "on" and should be capable of preventing current flow between the input and output circuits when switched "off." Its current-carrying characteristics should be relatively invariant, i.e. independent of the parameters of the signals being switched.

An electronic logic system is often used to control one or more switching devices in accordance with a sequence or pattern provided by the logic system. However, for conventional semiconductor switches, the control voltages usually need be of at least the same order of magnitude as the range of signals being switched. Thus intervening circuitry, such as transformers, frequently are used to raise the logic signal levels to magnitudes sufficient to drive the switching system.

In most switching systems where an input signal is switched between several different outputs, there can be considerable variation in the load impedances. Thus, elaborate and expensive circuitry has been developed to provide means for delivering an input signal which remains quite precise despite changes in the load impedance into which it feeds.

It is, therefore, a principal object of the present invention to provide novel current-switching means easily driven directly by typical digital electronic logic signal levels without intermediate amplifying drivers.

Still another object of the present invention is to provide a low-cost current-switching means in which substantially no significant potential arises across the element being switched.

Yet other objects of the present invention are to provide current-switching means in an analog multiplexing system wherein scaling can be achieved using no additional amplifiers for added signals; to provide a multiplexing system which is easily self-tested; to provide a current-switching system suitable for use in an analog-to-digital or digital-to-analog converter; and to provide a current-switching system suitable for maintaining a substantially constant load on source impedances, e.g. switching, as in a multiplexer, from a high-reactance source with high time constants.

Generally, these and other objects of the present invention are effected by a simple switching system which comprises an input terminal, connected to one side of a resistor, an operational amplifier having an input summing junction connectable to the other side of the resistor and its output connected to an output terminal, first switching means in series between the resistor and the summing junction for selectively connecting the two, second switching means for connecting the other side of the resistor selectively to system ground, and means for alternately driving the first and second switching means.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
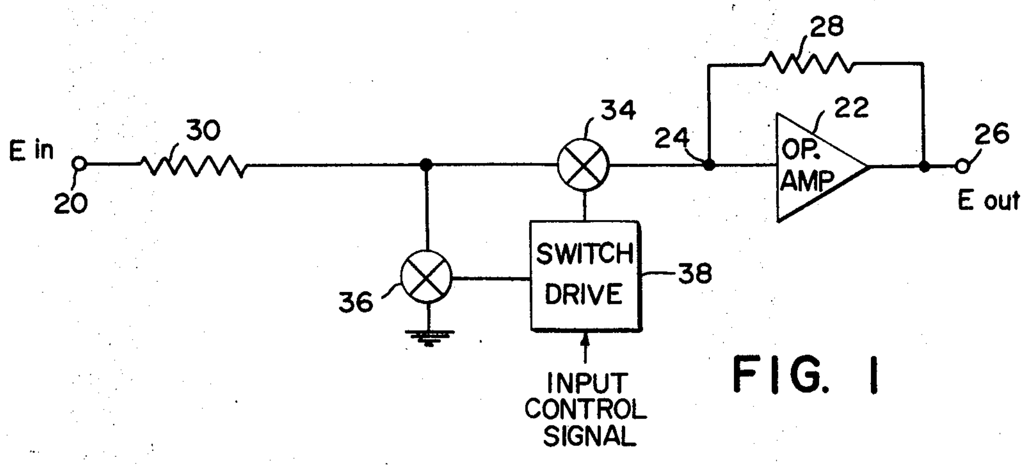
FIG. 1 is a block diagram of a general switching system of the present invention.

Referring now to FIG. 1, there is shown in the embodiment in block form, a switch of the present invention comprising input terminal 20 and operational amplifier 22. The latter typically comprises the usual very high gain, inverting, internal amplification stage having a summing junction 24 at its input and an output terminal 26. There is provided a negative feedback path from terminal 26 to the summing junction through impedance 28. Input terminal 20 is connected to one side of series load resistor 30, the other side of the load resistor being connected as at junction 32 to one side of first switching means such as switch 34. The other side of the latter is connected to summing junction 24 at the input of the operational amplifier.

Junction 32 is also connected to one side of second switching means or switch 36, the other side of switch 36 being grounded. Means such as drive control 38, are connected to both switches 34 and 36 for controlling operation of both the latter in accordance with input control signals applied to control 38 so that the states of the switches are substantially mutually exclusive, i.e. when one is "on" the other is "off" and vice versa.

In operation, a signal to be switched, $E_{in}$, is applied at terminal 20. Because switches 36 and 36 have exclusive states, one can assume initial conditions wherein switch 36 is closed or conductive and switch 34 is open. If resistor 30 has a value, R, the current $E_{in/R}$ passes then only between ground and terminal 20. When a control signal $Sx$ is applied to drive control 38 causing it to change the state of the switches, switch 34 closes and switch 36 opens. The path for the same current $E_{in/R}$ is now only between terminals 20 and 26. The impedance into which terminal 20 looks is, however, substantially unchanged because characteristically, the negative feedback around the amplifier tends to drive the potential at summing junction 24 toward ground and thus junction 24 constitutes a virtual ground. Thus, the current-switching system shown insures that the impedance presented to a source of input signal is substantially constant regardless of whether or not the signal is switched to terminal 26. Clearly, the switching system shown has the capability of switching currents regardless of the polarity of $E_{in}$, hence is truly bipolar. By selecting resistor 30 judiciously, one can scale arbitrary levels of input signals into any desired values for engineering purposes.

The switches can be a number of different semiconductor devices such as junction transistors, field effect transistors, and the like. Also, drive control 38 can be formed by a number of different circuits as will be apparent hereinafter.

Figure 2:
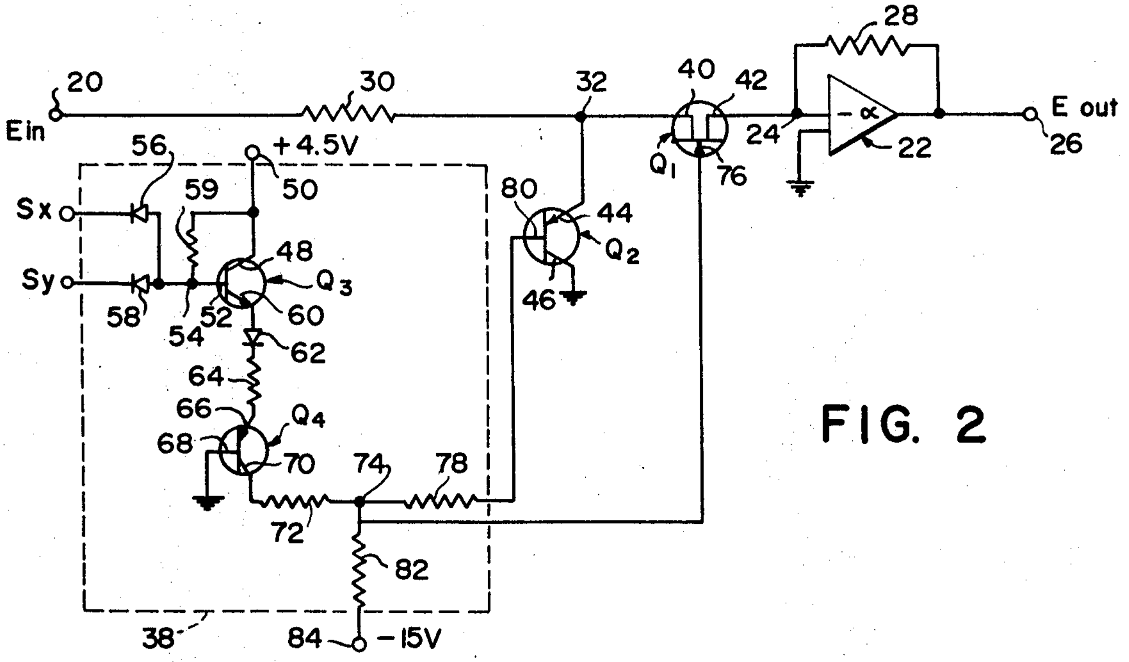
FIG. 2 is a schematic circuit diagram of a preferred embodiment of the invention shown in FIG. 1.

One embodiment of the present invention shown in FIG. 2 is particularly interesting because it provides a relationship which insures that it will operate on a make-before-break basis thereby insuring minimization of switching transients.

In FIG. 2 as in FIG. 1, input terminal 20 is connected to one side of series load resistor 30, the other side of the resistor being connected to junction 32. First switching means 34 is an *n*-channel field-effect transistor (FET) Q1. Source 40 and drain 42 of the FET are respectively connected to junction 32 and to summing junction 24 of operational amplifier 22. Second switching means 36 is a symmetrical transistor operating in inverted mode, such as a typical silicon PNP chopper transistor Q2 and thus its emitter 44 is connected to junction 32, and its collector 46 is connected to system ground.

As means 38 for driving the two switching means there is provided an NPN transistor Q3 in emitter-follower configuration, having its collector 48 connectable at terminal 50 to a source of positive voltage (e.g.+4.5 v.) and its base 52 connected to terminal 54 at which trigger signal can be applied typically through an AND gate formed of diodes 56 and 58 having their anodes connected in common to terminal 54. Collector 48 and base 52 of transistor Q3 are connected to one another through resistor 59.

Emitter 60 of transistor Q3 is connected to the anode of diode 62, the cathode of the latter being connected through resistor 64 to emitter 66 of PNP transistor Q4. The latter is in grounded-base amplifier configuration, hence its base 68 is grounded. Collector 70 of transistor Q4 is connected through resistor 72 to junction 74. Junction 74 is connected to gate 76 of transistor Q1, is connected through resistor 78 to base 80 of transistor Q2 and is also connected through resistor 82 to terminal 84 at which a negative voltage source can be applied.

It will be seen that if the base of transistor Q2 is negative, a current can drive the base so that the transistor will form a conduction path between terminal 20 and ground. Transistor Q1 is "on" when gate 76 is at ground or at a potential not appreciably more negative than the source or drain, and will be "off" when the gate is negative by an amount defined by the pinch-off characteristic of the FET, e.g. 6 or 7 volts.

Now, assuming transistor Q1 is "on," of course current through resistor 30 due to $E_{in}$ flows between terminal 20 and ground. A current also flows from ground through resistor 78 and 82 to terminal 84 which typically is held at about −15 v. Due to the voltage divider effect of resistor 78 and 82, gate 76 of transistor Q1 then sits at a potential of about −10 v. and transistor Q1 is held off, preventing current flow into amplifier 22.

When diodes 56 and 58 are both energized by typical digital logic signal levels, e.g. about 3 ½ volts, the potential at the base of transistor Q3 is raised and emitter 60 follows this rise, going to for example, about 3 ½volts. Because transistor Q4 is a grounded base amplifier, it turns "on" when current through resistor 64 is supplied to emitter 66. Hence, collector 70 goes to the emitter potential which is about a diode drop above ground. Resistor 72 has a value sufficient to compensate for this diode drop (indeed can even be a diode itself), thus gate 76 will be brought only to ground from the previous −10 v. potential, turning transistor Q1 "on." This also serves to bring the base of transistor Q1 toward ground and, then there being no current flow into the latter, transistor Q2 turns "off" just after transistor Q1 turns "on."

When either of the diodes 56 or 58 is driven toward ground, the emitter of transistor Q3 goes toward ground potential, turning transistor Q4 "off." Current flow is then reestablished to the base 80 of transistor Q2 allowing the latter to turn "on" as the voltage on gate 76 goes negative, turning transistor Q1 "off."

Typically, circuit values are for use with about +4 v. and −15 v. potentials at terminals 50 and 84 respectively:

| | |
|---|---|
| Resistor 64 | 500 Ω |
| Resistor 72 | 500 Ω |
| Resistor 82 | 10KΩ |
| Resistor 78 | 20KΩ |

The value of precision resistor 30 can be arbitrarily established depending only on the current carrying capabilities of transistors Q1 and Q2 and the operational amplifier.

Figure 3:
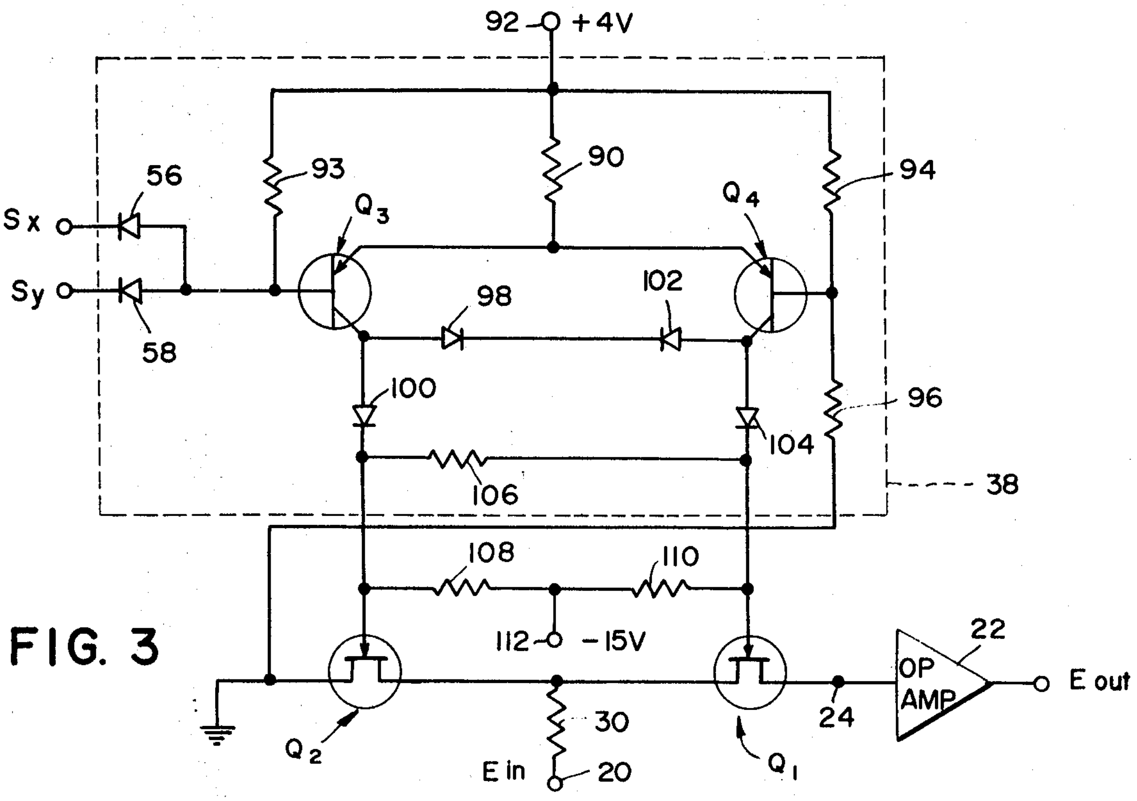
FIG. 3 is a schematic circuit diagram of yet another embodiment of the switching means of FIG. 1.

A modification of the invention is shown in the embodiment of FIG. 3 wherein transistors Q1 and Q3 are both *n*-channel FET's, and the drain of one is connected to ground with its source connected to the source of the other, the drain of the latter, in turn being connected to summing junction 24 of operational amplifier 22. Signal input terminal 20 is connected to a point between transistors Q1 and Q2. Obviously, then if transistors Q1 and Q2 have mutually exclusive conduction states, the signal $E_{in}$ applied to terminal 20 will be either fed to system ground through transistor Q2 or to the virtual ground at junction 24 through transistor Q1.

As means for driving transistors Q1 and Q2 for controlling the conductive states of the latter, there are provided two symmetrical PNP transistors Q3 and Q4 having directly coupled emitters also connected through resistor 90 to terminal 92 at which a positive voltage e.g. +4 v., is to be applied. The base of transistor Q3 is connected to an AND gate formed of diodes 56 and 58 as in FIG. 2, at which control signals $S_x$ and $S_y$ can be applied. The bases of transistors Q3 and Q4 are also respectively connected to terminal 92 through resistors 93 and 94. The base of transistor Q4 is further connected through resistor 96 to ground.

The collector of transistor Q3 is connected to the anodes of diodes 98 and 100, the cathodes of these diodes being respectively connected to system ground and to the gate of transistor Q2. Similarly, the collector of transistor Q4 is connected to the anodes of diodes 102 and 104, the cathode of the former being grounded and of the latter being connected to the gate of transistor Q1. The anodes of diodes 100 and 104 are connected to one another through a high resistance 106 (e.g. 39KΩ) to one another. Lastly, the gates of transistors Q2 and Q1 respectively are connected through corresponding resistors 108 and 110 to terminal 112 at which a negative bias voltage, i.e. −15 v., is to be applied.

In operation, transistor Q3 is normally "on" when its base is near ground and the emitter of transistor Q3 is at a voltage approximately a diode drop above the base potential. The collector of transistor Q3 being connected to ground through diode 98, is therefore at a voltage about a diode drop above ground, and is thus clamped to keep transistor Q3 from going into deep saturation in order to facilitate fast switching. Because the collector of transistor Q3 is also connected through diode 100 to the gate of transistor Q2, diode 100 serves to compensate for the diode drop due to diode 98 and prevents the gate from going positive with respect to ground. The gate potential is thus established to allow current conduction through transistor Q2 between terminal 20 and system ground.

It will be apparent that when transistor Q3 is in conduction, because its emitter is coupled to the emitter of transistor Q4 and because the voltage on the base of transistor Q4 due to the voltage divider action of resistors 94 and 96 can be established at a value which is positive with respect to the emitter voltage, transistor Q3 will not conduct. Hence, the gate of transistor Q1 will be at a negative voltage, e.g. −10 v. and transistor Q1 is held "off."

Now, when the voltage applied to the base of transistor Q3 through the AND gate connected thereto rises, the current supplied by the gate input sources drops so that the transistor Q3 becomes nonconductive. Thus, the voltage on emitters of transistors Q3 and Q4 rises until it goes positive with respect to the voltage on the base of transistor Q4. The latter then begins to conduct. Consequently, the potential on the collector of transistor Q4 will go toward ground due to the coupling through clamp diode 102 to ground and removes the pinch-off voltage from the gate of transistor Q1, allowing the latter now to conduct. As transistor Q3 goes out of conduction, its collector goes toward a negative voltage due to the voltage divider action of resistors 108 and 106, pulling the gate of transistor Q2 to its pinch-off potential. Hence, transistor Q2 turns "off." Exemplary circuit values are as follows:

| | |
|---|---|
| Resistor 93 | 3.9KΩ |
| Resistor 94 | 3.9KΩ |
| Resistor 90 | 1KΩ |
| Resistor 96 | 2.4KΩ |
| Resistor 106 | 43KΩ |
| Resistor 108 | 20KΩ |
| Resistor 110 | 20KΩ |

Figure 4:
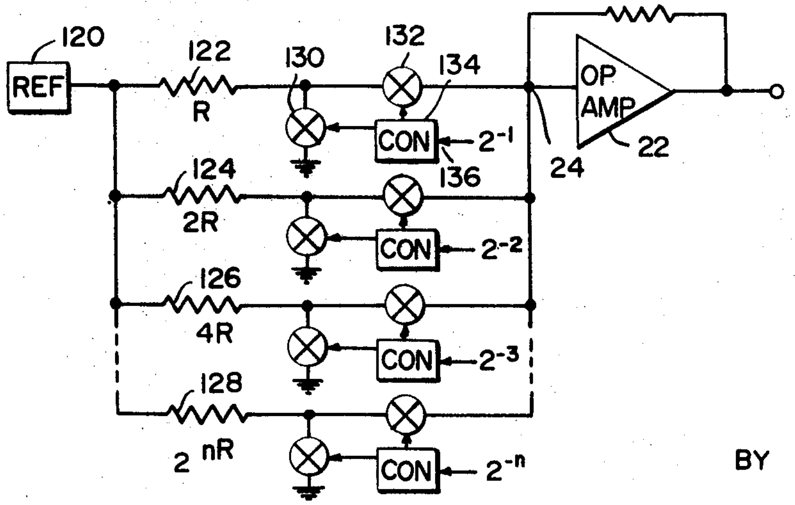
FIG. 4 is a block diagram showing the switch means of FIG. 1 embodied in a typical digital-to-analog converter configuration.

As shown in FIG. 4, the switching device of the present invention is particularly applicable to a number of devices requiring multiple switches and particularly to digital-to-analog converters of the ladder type illustrated. Such converters employ a reference voltage source 120 connected to a common junction 121 to which a plurality of precision resistors 122, 124, 126 and 128 are connected in parallel to one another and the resistors are weighted in the usual manner according to a digital code such as binary; thus resistors 122, 124, 126, and 128 have values of R, 2R, 4R, and *n*R. Each resistor, however, is connected to a switching system of the present invention shown typically as shunt switch 130 to ground, series switch 132 and switch drive control 134. Each switch drive control is connected to an input control terminal 36 at which the proper signal representative of a binary value can be applied, i.e. $2^{11}$, $2^{12}$, $2^{13}$, . . . . $2^{1n}$. The outputs of all series switches are connected in common to summing junction 24 at the input of operational amplifier 22.

If, for example, there is an input signal of binary 0.0111 (decimal 7/16) the corresponding drive controls will switch the respective switches 132 to "on" and corresponding switches 130 to "off." Current flow occurs through resistors 122, 124 and 126 between the reference source and junction 24, the current sum being the analog equivalent of binary 0.0111, and current flow also occurs through resistor 28 to ground through the corresponding shunt switch. If now, the binary signal is removed so that all switches 130 are closed and all switches 132 are open, the same total current will continue to flow, but to system ground. Obviously, the load on reference source 120 remains constant regardless of the states of the series-shunt switch combinations, and the reference source can be easily designed because one need not plan for the changing impedance load normally expected in this type of converter. It will be seen that because the switching system of the present invention possesses the ability to switch currents into a nulling point, there is no need to charge capacitors with varying voltages as is common in many converters.

Figure 5:
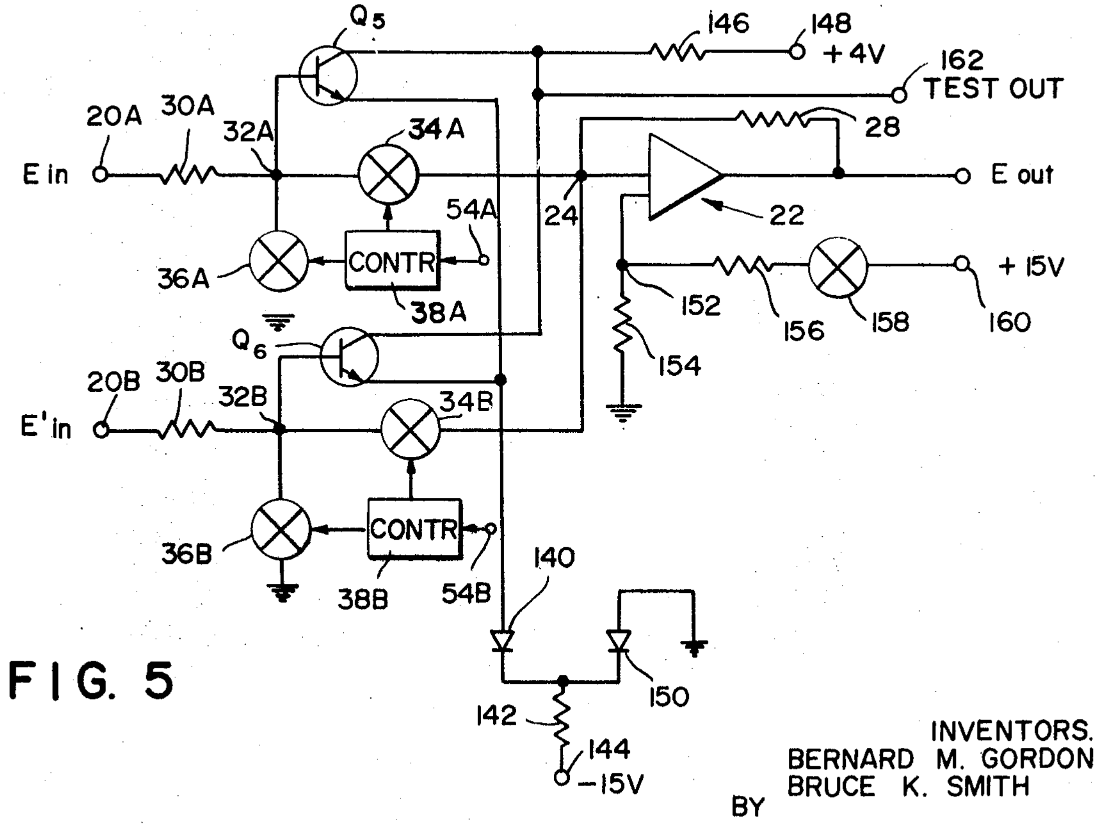
FIG. 5 is a circuit diagram partly in block form showing the switching means of FIG. 1 used in a multiplexing system including a self-testing circuit.

In switching systems, such as multiplexers, in which a plurality of signal sources are successively switched to a common output line, it is frequently quite difficult to determine quickly if one or more switches are malfunctioning The switching system of the present invention can advantageously be incorporated into circuitry which permits a rapid self-testing of each switching assembly, as shown schematically in FIG. 5.

For convenience, FIG. 5 only shows a two input multiplex system, although it will be clear that a larger number of input signals can be accepted with appropriate modifications. The multiplexer of FIG. 5 includes first and second input terminals 20A and 20B at which respective input signals $E_{in}$ and $E_{in}$ can be applied. Terminal 20A is connected to one side of precision resistor 30A, the other side of the latter being at junction 32A which is connectable to ground through switch 36A, or through switch 34A to summing junction 24 at the input to operational amplifier 22. As previously described, switches 34A and 36A are controlled by drive control means 38A in accordance to control signals applied to the latter, as at terminal 54A. Terminal 20B is connected in like manner through resistor 30B to junction 32B which is connectable either to ground or junction 24 respectively through switches 36B and 34B responsively to signals applied to drive control means 38B at terminal 54B.

A self-test circuit is provided, including transistor Q5 having its base connected to junction 32A and its emitter connected to anode of diode 140, the cathode of which is connected through resistor 142 to terminal 144 at which a voltage can be applied. The collector of transistor Q1 is connected through resistor 146 to terminal 148. Because, in the embodiment shown transistor Q5 is an NPN type device, the voltages to be applied at terminals 144 and 148 are respectively negative and positive, e.g. −15 v. and +4 v. Diode 140 is connected cathode-to-cathode to diode 150, which has its anode grounded and acts as a current limiter.

Similarly, junction 32B is connected to the base of NPN transistor Q6, the collector and emitter of which are respectively connected to the collector and emitter of transistor Q5. Lastly, it will be appreciated that operational amplifier includes two input terminals, one inverting and one noninverting. The former, of course, is connected in the usual manner to summing junction 24 and the latter is connected to junction 152. Junction 152 is connected to ground through resistor 154 and also through resistor 156 to one side of test switch 158, the other side of switch 158 being connectable at terminal 160 to a source of positive voltage, e.g. +15 v.

In normal operation, the bases of transistors Q5 and Q6 will be at ground regardless of the states of the switch combinations 34A–36A and 34B–36B. The emitters of transistors Q5 and Q6 are at about ground, hence neither transistor is in conduction. If switch 158 is open, then the noninverting input of amplifier 22 is also at ground (neglecting any small offset). The collectors of transistors Q5 and Q6 sit, therefore, at about 4 volts which can be detected as at test terminal 162.

Now if switch 158 is closed, the potential at the noninverting input to amplifier 22 will rise to a value, for example +1.2 v., determined by the ratio of values of resistors 154 and 156. Assuming that all of the series switches such as 34A and 34B are in accordance with signals at terminal 54A and 54B, open, then the potential at summing junction 24 will rise to the +1.2 v., value due to feedback through resistor 28. Of course, neither transistor Q5 or Q6 is affected by the change in potential at terminal 24, hence the test signal at terminal 162 remains unchanged.

If it is assumed that switch 36A in fact is open-circuited although supposedly closed, the potential at the corresponding junction 32A will rise, causing the transistor Q5 to go into conduction. This causes current to flow through resistor 146, pulling down the voltage apparent at terminal 162. If a series switch such as 34A is supposed to be closed, shunt switch 36A will of course be open, and if in fact switch 36A is short circuited, the voltage at terminal 162 will remain constant when it should have fallen. Preferably, switch 158 should be operated to test the condition of each series-shunt switch combination after each switching operation of that combination so that a switch failure not only can be detected quickly, but by cycling the operation of the switch combination one can pinpoint the defective switches.

Since certain changes may be made in the above apparatus without departing from the scope of the invention herein involved it is intended that all matter contained in the above description or shown in the accompanying drawing shall be interpreted in an illustrative and not in a limiting sense.

We claim:

1. A bipolar switching device comprising in combination:

a system input terminal;

a resistive impedance having a first end connected to said terminal;

an operational amplifier having an input-summing junction;

a negative feedback loop connected between the output of said amplifier and said input-summing junction, whereby said junction is a virtual ground; and means for connecting the second end of said impedance substantially alternatively either to said junction or to system ground along paths exhibiting substantially no voltage drop, substantially constant impedance being presented at said input terminal regardless of whether said impedance is connected to said junction or system ground;

said means for controlling including first and second controllable switching means and means for controlling both of said switching means;

said first controllable switching means for connecting said second end of said impedance to system ground when closed or for disconnecting said second end from said ground when open;

said second controllable switching means for connecting said second end of said impedance to said junction when closed or for disconnecting said junction from said second end when open; and said means for controlling both of said switching means so that substantially when on switching means is closed, the other is open, and vice versa;

said first and second switching means each including a field-effect transistor;

said transistor being connected source to source;

said sources being connected to said second end of said impedance, the drains of said field-effect transistors being respectively connected to said summing junction and to system ground;

said means for controlling including a differential amplifier having a third and fourth transistor with their emitters coupled to one another, said third transistor being disposed so that said means for respectively connecting the base to said third and fourth transistors to a first voltage supply terminal;

means for connecting said first voltage supply terminal to said coupled emitters;

means for connecting the base of said fourth transistor to system ground;

first and second diodes having like electrodes connected to one another and to ground and having their other electrodes connected respectively to the collectors of said third and fourth transistors;

a third diode connected between the collector of the said third transistor and the gate electrode of one of said field-effect transistor;

a fourth diode connected between the collector of said fourth transistor and the gate electrode of the other of said field-effect transistor;

a first resistor connected between said gate electrodes;

second and third resistors in series between said gate electrodes and in parallel to said first resistor; and means connecting the junction of said second and third resistors to a second voltage supply terminal.

2. A bipolar switching device comprising in combination:

a system input terminal;

a first resistive impedance having a first end connected to said terminal;

an operational amplifier having an input-summing junction, and an output terminal;

a first resistor having a first and a second end, said first end of said first resistor connected directly to said input-summing junction, said second end of said first resistor connected directly to said output terminal, said first resistor being connected as a negative feedback loop and operating to make said input-summing junction a virtual ground;

means connected to said second end of said first impedance, said input-summing junction and system ground for connecting the second end of said first impedance substantially alternatively either to said junction or to system ground along paths exhibiting substantially no voltage drop, substantially constant impedance being presented at said input terminal regardless of whether said first impedance is connected to said junction of system ground;

said means for connecting comprises first controllable switching means for connecting said second end of said first impedance to system ground when closed or for disconnecting said second end of said first impedance from said ground when open; and second controllable switching means for connecting said second end of said first impedance to said junction when closed or for disconnecting said junction from said second end of said first impedance when open; and means for controlling both of said switching means so that substantially when one switching means is closed, the other is open, and vice versa;

said first switching means comprises a first symmetrical transistor having control, input and output terminals connected for operation in an inverted mode with said input and output terminals being respectively connected to said second end of said first impedance and ground;

said second switching means comprises a field-effect transistor having its source-drain circuit connected between said second end of said first impedance and said junction; and wherein said control terminal and the gate of said field-effect transistor are connected to said means for controlling;

said means for controlling comprises transistor circuit means adapted to be in mutually exclusive states of conduction or nonconduction responsively to a control signal; and a voltage divider network, connected to said transistor circuit means and said control terminal and gate so that when said circuit means is in one of said states, said field-effect transistor is biased into a nonconductive condition and said first transistor is biased into conduction, and when said circuit means is in the other of said states, said field-effect transistor is biased into a conductive condition and said first transistor is biased into a nonconduction;

said network comprises a second resistor and third resistor connected in series between said transistor circuit means and the control terminal of said first transistor;

a fourth resistor connected in series between a voltage supply terminal and the junction of said second and third resistors; and means connecting the junction of said second and third resistors to said gate.

3. A switching system comprising, in combination a plurality of input terminals each respectively connected to one side of a corresponding resistive impedance;

an operational amplifier having an input-summing junction and an output terminal junction;

a negative feedback loop connected between the output of said amplifier and said input summing junction, said negative feedback loop being a resistor connected serially between said input-summing junction and output terminal, whereby said junction is a virtual ground;

a plurality of first switches, each being disposed for connecting or disconnecting said junction from the corresponding other ends of said impedance with substantially no voltage drop across said first switches;

a plurality of second switches, each being disposed for connecting or disconnecting said corresponding other ends of system ground with substantially no voltage drop across second switches; and a plurality of means for controlling each pair of first and second switches corresponding to each impedance so that said first and second switches of each said pair are in mutually exclusive conductive states.

4. A switching system as defined in claim 3 including:

a source of reference voltage connected in common to said input terminals, each of said impedance has an ohmic value established as a unique one of a set of values established according to a predetermined digital code.

5. A bipolar switching device comprising in combination:

a system input terminal;

a resistive impedance having a first end connected to said terminal;

an operational amplifier having an input-summing junction and an output terminal;

a negative feedback loop connected between said output terminal of said amplifier and said input-summing junction, said negative feedback loop being a resistor connected serially between said input-summing junction and output terminal, said junction being a virtual ground; and means for connecting the second end of said impedance substantially alternatively either to said junction or to system ground along paths exhibiting substantially no voltage drop, substantially constant impedance being presented at said input terminal regardless of whether said impedance is connected to said junction or system ground.

6. A switching device as defined in claim 5 wherein said means for connecting comprises:

first controllable switching means for connecting said second end of said impedance to system ground when closed or for disconnecting said second end from said ground when open;

second controllable switching means for connecting said second end of said impedance to said junction when closed or for disconnecting said junction from said second end when open; and means for controlling both of said switching means so that substantially when one switching means is closed, the other is open, and vice versa.

7. A switching device as defined in claim 6 including a transistor having its base connected to said second end of said impedance;

means for biasing said transistor into a nonconductive state wherein the collector of said transistor remains at a predetermined potential when said junction is at ground potential, and for biasing said transistor into conduction when the potential at said junction deviates from ground so that the potential at the collector of said transistor changes responsively to such deviation; and a test terminal connected to the collector of said transistor.

8. A switching device as defined in claim 6 wherein said first and second switching means each comprises a field-effect transistor;

said transistor being connected source to source;

said sources being connected to said second end of said impedance, the drains of said field-effect transistors being respectively connected to said summing junction and to system ground.

9. A switching device as defined in claim 8 wherein said means for controlling comprises a differential amplifier having a third and fourth transistor with their emitters coupled to one another, said third transistor being disposed so that said control signal can be applied thereto;

means for respectively connecting the bases to said third and fourth transistors to a first voltage supply terminal;

means for connecting said first voltage supply terminal to said coupled emitters;

means for connecting the base of said fourth transistor to system ground;

first and second diodes having like electrodes connected to one another and to ground and having their other electrodes connected respectively to the collectors of said third and fourth transistors;

a third diode connected between the collector of the said third transistor and the gate electrode of one of said field-effect transistor;

a fourth diode connected between the collector of said fourth transistor and the gate electrode of the other of said field-effect transistor;

a first resistor connected between said gate electrodes;

second and third resistors in series between said gate electrodes and in parallel to said first resistor; and means connecting the junction of said second and third resistors to a second voltage supply terminal.